(12) United States Patent
Zhou et al.

(10) Patent No.: US 11,361,188 B2
(45) Date of Patent: Jun. 14, 2022

(54) METHOD AND APPARATUS FOR OPTIMIZING TAG OF POINT OF INTEREST

(71) Applicant: Beijing Baidu Netcom Science and Technology Co., Ltd., Beijing (CN)

(72) Inventors: Jingbo Zhou, Beijing (CN); Renjun Hu, Beijing (CN); Hui Xiong, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 133 days.

(21) Appl. No.: 16/857,542

(22) Filed: Apr. 24, 2020

(65) Prior Publication Data
US 2021/0019564 A1 Jan. 21, 2021

(30) Foreign Application Priority Data
Jul. 17, 2019 (CN) .......................... 201910647020.0

(51) Int. Cl.
*G06K 9/62* (2022.01)
*G06N 20/20* (2019.01)
*G06V 10/42* (2022.01)

(52) U.S. Cl.
CPC ......... *G06K 9/6256* (2013.01); *G06K 9/6262* (2013.01); *G06N 20/20* (2019.01); *G06V 10/42* (2022.01)

(58) Field of Classification Search
CPC ...... G06K 9/6256; G06K 9/52; G06K 9/6262; G06K 9/6267; G06N 20/20; G06N 20/00; G06F 16/9537; G06F 16/955
See application file for complete search history.

(56) References Cited

U.S. PATENT DOCUMENTS 8,935,263 B1 * 1/2015 Rodriguez ............. G06Q 30/02
  707/748
2002/0161664 A1 * 10/2002 Shaya ................. G06Q 30/0254
  705/7.31

(Continued)

FOREIGN PATENT DOCUMENTS

CN 109241454 A 1/2019

OTHER PUBLICATIONS

Zhou, Jingbo et al., "A Collaborative Learning Framework to Tag Refinement for Points of Interest", Vancouver: In proceedings of the 25th ACM SIGKDD, International Conference on Knoweledge Discovery & Data Mining Jul. 25, 2019 (pp. 1752-1761).*

(Continued)

*Primary Examiner* — Samir A Ahmed
(74) *Attorney, Agent, or Firm* — Nixon Peabody LLP (57) ABSTRACT

Embodiments of the present disclosure provide a method and apparatus for optimizing a tag of a point of interest. The method includes: acquiring a set of points of interest and a set of tags of points of interest in the set of points of interest; generating a point of interest-tag matrix based on the set of points of interest and the set of tags of points of interest in the set of points of interest; extracting a feature of a point of interest-tag in the point of interest-tag matrix; inputting the feature of the point of interest-tag in the point of interest-tag matrix into a pre-trained ternary self-adaptive collaborative learning model, to obtain a point of interest-tag score matrix; and optimizing the set of tags of points of interest in the set of points of interest based on the point of interest-tag score matrix.

13 Claims, 3 Drawing Sheets

(56) References Cited

U.S. PATENT DOCUMENTS

| | | | | |
|---|---|---|---|---|
| 2012/0030020 | A1* | 2/2012 | Bucak | G06Q 30/0255 |
| | | | | 705/14.53 |
| 2012/0303561 | A1* | 11/2012 | Sathish | G06N 20/00 |
| | | | | 706/14 |
| 2018/0165554 | A1* | 6/2018 | Zhang | G06K 9/6256 |
| 2018/0246972 | A1* | 8/2018 | Shukla | G06F 16/9535 |
| 2018/0246973 | A1* | 8/2018 | Zhao | G06F 16/9535 |
| 2018/0246974 | A1* | 8/2018 | Shukla | G06F 16/9535 |
| 2018/0253496 | A1* | 9/2018 | Natchu | H04L 67/02 |
| 2018/0285779 | A1* | 10/2018 | Zhou | G06F 16/285 |
| 2019/0258719 | A1* | 8/2019 | Baker | G06F 40/53 |

OTHER PUBLICATIONS

Lops, Pasquale et al., "Content-based and collaborative techniques for tag recommendation: an empirical evaluation", Journal of Intelligent Information Systems. Feb. 1, 2013;40(1):41-61.*

Liu, Dong et al., "Content-based tag processing for Internet social images", Multimedia Tools and Applications. Jan. 2011; 51(2):723-38.*

Jiang, Shuhui et al., "Author Topic Model-Based Collaborative Filtering for Personalized POI Recommendations", IEEE transactions on multimedia. Mar. 26, 2015;17(6):907-18.*

"Research and Implementation of Tag Completing on Community Images Based on Semantic Context"; Beijing Jiaotong University, with English Abstract only; Jun. 2016 (72 pages).

* cited by examiner

METHOD AND APPARATUS FOR OPTIMIZING TAG OF POINT OF INTEREST

CROSS-REFERENCE TO RELATED APPLICATIONS

This application claims priority to Chinese Patent Application No. 201910647020.0, filed on Jul. 17, 2019, titled "Method and apparatus for optimizing tag of point of interest," which is hereby incorporated by reference in its entirety.

TECHNICAL FIELD

Embodiments of the present disclosure relate to the field of computer technology, and specifically to a method and apparatus for optimizing a tag of a point of interest.

BACKGROUND

A tag of a point of interest (POI) is important basic data for a map application to provide services. In the map application, the tag of the point of interest may help a user quickly find a corresponding point of interest. For example, when a user searches for a "hotel", all points of interest including a tag "hotel" may be returned to the user, such that the user quickly finds out a point of interest providing related services. In addition, in a scenario, such as recommending the point of interest, or location-based advertising, the tag of the point of interest plays an important role.

At present, common approaches of acquiring the tag of the point of interest mainly include two approaches as follows. First, manually annotating the tag of the point of interest by user crowdsourcing annotation. Second, extracting tag information from comments related to the point of interest by using a natural language processing technology.

SUMMARY

Embodiments of the present disclosure provide a method and apparatus for optimizing a tag of a point of interest.

In a first aspect, an embodiment of the present disclosure provides a method for optimizing a tag of a point of interest, including: acquiring a set of points of interest and a set of tags of points of interest in the set of points of interest; generating a point of interest-tag matrix based on the set of points of interest and the set of tags of points of interest in the set of points of interest; extracting a feature of a point of interest-tag in the point of interest-tag matrix; inputting the feature of the point of interest-tag in the point of interest-tag matrix into a pre-trained ternary self-adaptive collaborative learning model, to obtain a point of interest-tag score matrix; and optimizing the set of tags of points of interest in the set of points of interest based on the point of interest-tag score matrix.

In some embodiments, the feature of the point of interest-tag includes at least one of following items: an attribute feature of a point of interest, an image feature of the point of interest, an image feature of a tag, a tag feature of the point of interest, or a tag feature of the tag.

In some embodiments, the extracting a feature of a point of interest-tag in the point of interest-tag matrix includes: determining, for a point of interest in the point of interest-tag matrix, historical access users and/or historical retrieval users of the point of interest; aggregating user images of the historical access users and/or the historical retrieval users of the point of interest to obtain an image feature of the point of interest; determining, for a tag in the point of interest-tag matrix, a point of interest belonging to the tag; and generating an image feature of the tag based on the image feature of the points of interest belonging to the tag; and/or determining, for a point of interest in the point of interest-tag matrix, an adjacent point of interest to the point of interest based on map retrieval data; statisticizing tag distribution of the adjacent point of interest to the point of interest to obtain a tag feature of the point of interest; determining, for a tag in the point of interest-tag matrix, a point of interest belonging to the tag; and generating the tag feature of the tag based on the tag feature of the point of interest belonging to the tag.

In some embodiments, the generating an image feature of the tag based on the image feature of the point of interest belonging to the tag includes: computing an average value of the image feature of the point of interest belonging to the tag, for use as the image feature of the tag, and the generating the tag feature of the tag based on the tag feature of the point of interest belonging to the tag includes: computing an average value of the tag feature of the point of interest belonging to the tag, for use as the tag feature of the tag.

In some embodiments, before the inputting the feature of the point of interest-tag in the point of interest-tag matrix into a pre-trained ternary self-adaptive collaborative learning model, to obtain a point of interest-tag score matrix, the method further includes: integrating a pre-trained first machine learning model, a second machine learning model, and a prediction model to obtain the ternary self-adaptive collaborative learning model, wherein the first machine learning model is established based on points of interest in the point of interest-tag matrix, the second machine learning model is established based on tags in the point of interest-tag matrix, and the prediction model is established based on the points of interest in the point of interest-tag matrix.

In some embodiments, the first machine learning model, the second machine learning model, and the prediction model are obtained by following training: establishing a decomposition process from the point of interest-tag matrix to QR by non-negative matrix factorization, to obtain a decomposition loss function, wherein the QR is a result of orthogonal triangular decomposition of the point of interest-tag matrix, Q is an orthogonal matrix, and R is an upper triangular matrix; establishing a matching model from the point of interest to the tag, wherein the matching model is established based on a product of the first machine learning model and a transpose of the second machine learning model; optimizing the first machine learning model and the second machine learning model by cross entropy, to obtain a first loss function; obtaining a second loss function, a third loss function, and a fourth loss function based on the first machine learning model, the second machine learning model, and the QR; performing weighted summation on the first loss function, the second loss function, the third loss function, and the fourth loss function, to obtain a loss function of the first machine learning model and the second machine learning model; optimizing the prediction model by cross entropy to obtain a fifth loss function; obtaining a sixth loss function based on the prediction model and the QR; performing weighted summation on the fifth loss function and the sixth loss function, to obtain a loss function of the prediction model; and minimizing a weighted sum of the decomposition loss function, the loss function of the first machine learning model and the second machine learning model, and the loss function of the prediction model, and obtaining the first machine learning model, the second machine learning model, and the prediction model by training.

In some embodiments, the optimizing the first machine learning model and the second machine learning model by cross entropy, to obtain a first loss function includes: computing the first loss function based on the point of interest-tag matrix, the first machine learning model, and the second machine learning model.

In some embodiments, the obtaining a second loss function, a third loss function, and a fourth loss function based on the first machine learning model, the second machine learning model, and the QR includes: computing a column sum norm of a difference between a product of the first machine learning model and the second machine learning model, and the QR, to obtain the second loss function; computing a spectral norm of a difference between a product of the first machine learning model and a transpose of the first machine learning model, and a product of the QR and a transpose of the QR, to obtain the third loss function; and computing a spectral norm of a difference between a product of the second machine learning model and a transpose of the second machine learning model, and a product of the transpose of the QR and the QR, to obtain the fourth loss function.

In some embodiments, the optimizing the prediction model by cross entropy to obtain a fifth loss function includes: computing the fifth loss function based on the point of interest-tag matrix and the prediction model.

In some embodiments, the obtaining a sixth loss function based on the prediction model and the QR includes: computing a spectral norm of a difference between the prediction model and the QR, to obtain the sixth loss function.

In some embodiments, the optimizing the set of tags of points of interest in the set of points of interest based on the point of interest-tag score matrix includes: adding, for a point of interest-tag score in the point of interest-tag score matrix, in response to the point of interest-tag score being higher than a first preset score, and a set of tags of points of interest corresponding to the point of interest-tag score excluding a tag corresponding to the point of interest-tag, the tag corresponding to the point of interest-tag into the set of tags of points of interest corresponding to the point of interest-tag score; and deleting, in response to the point of interest-tag score being lower than a second preset score, and the set of tags of points of interest corresponding to the point of interest-tag score including the tag corresponding to the point of interest-tag, the tag corresponding to the point of interest-tag from the set of tags of points of interest corresponding to the point of interest-tag score.

In a second aspect, an embodiment of the present disclosure provides an apparatus for optimizing a tag of a point of interest, including: an acquiring unit configured to acquire a set of points of interest and a set of tags of points of interest in the set of points of interest; a generating unit configured to generate a point of interest-tag matrix based on the set of points of interest and the set of tags of points of interest in the set of points of interest; an extracting unit configured to extract a feature of a point of interest-tag in the point of interest-tag matrix; a learning unit configured to input the feature of the point of interest-tag in the point of interest-tag matrix into a pre-trained ternary self-adaptive collaborative learning model, to obtain a point of interest-tag score matrix; and an optimizing unit configured to optimize the set of tags of points of interest in the set of points of interest based on the point of interest-tag score matrix.

In some embodiments, the feature of the point of interest-tag includes at least one of following items: an attribute feature of a point of interest, an image feature of the point of interest, an image feature of a tag, a tag feature of the point of interest, or a tag feature of the tag.

In some embodiments, the extracting unit includes: a first determining subunit, configured to determine, for a point of interest in the point of interest-tag matrix, historical access users and/or historical retrieval users of the point of interest; an aggregating subunit configured to aggregate user images of the historical access users and/or the historical retrieval users of the point of interest to obtain an image feature of the point of interest; a second determining subunit configured to determine, for a tag in the point of interest-tag matrix, a point of interest belonging to the tag; and a first generating subunit configured to generate an image feature of the tag based on the image feature of the points of interest belonging to the tag; and/or a third determining subunit configured to determine, for a point of interest in the point of interest-tag matrix, an adjacent point of interest to the point of interest based on map retrieval data; a statisticizing subunit configured to statisticize tag distribution of the adjacent point of interest to the point of interest to obtain a tag feature of the point of interest; a fourth determining subunit configured to determine, for a tag in the point of interest-tag matrix, a point of interest belonging to the tag; and a second generating subunit configured to generate the tag feature of the tag based on the tag feature of the point of interest belonging to the tag.

In some embodiments, the first generating subunit is further configured to: compute an average value of the image feature of the point of interest belonging to the tag, for use as the image feature of the tag, and the second generating subunit is further configured to compute an average value of the tag feature of the point of interest belonging to the tag, for use as the tag feature of the tag.

In some embodiments, the apparatus further includes: an integrating unit configured to integrate a pre-trained first machine learning model, a second machine learning model, and a prediction model to obtain the ternary self-adaptive collaborative learning model, where the first machine learning model is established based on points of interest in the point of interest-tag matrix, the second machine learning model is established based on tags in the point of interest-tag matrix, and the prediction model is established based on the points of interest in the point of interest-tag matrix.

In some embodiments, the first machine learning model, the second machine learning model, and the prediction model are obtained by the following training: establishing a decomposition process from the point of interest-tag matrix to QR by non-negative matrix factorization, to obtain a decomposition loss function, where the QR is a result of orthogonal triangular decomposition of the point of interest-tag matrix, Q is an orthogonal matrix, and R is an upper triangular matrix; establishing a matching model from the point of interest to the tag, where the matching model is established based on a product of the first machine learning model and a transpose of the second machine learning model; optimizing the first machine learning model and the second machine learning model by cross entropy, to obtain a first loss function; obtaining a second loss function, a third loss function, and a fourth loss function based on the first machine learning model, the second machine learning model, and the QR; performing weighted summation on the first loss function, the second loss function, the third loss function, and the fourth loss function, to obtain a loss function of the first machine learning model and the second machine learning model; optimizing the prediction model by cross entropy to obtain a fifth loss function; obtaining a sixth loss function based on the prediction model and the QR;

performing weighted summation on the fifth loss function and the sixth loss function, to obtain a loss function of the prediction model; and minimizing a weighted sum of the decomposition loss function, the loss function of the first machine learning model and the second machine learning model, and the loss function of the prediction model, and obtaining the first machine learning model, the second machine learning model, and the prediction model by training.

In some embodiments, the optimizing the first machine learning model and the second machine learning model by cross entropy, to obtain a first loss function includes: computing the first loss function based on the point of interest-tag matrix, the first machine learning model, and the second machine learning model.

In some embodiments, the obtaining a second loss function, a third loss function, and a fourth loss function based on the first machine learning model, the second machine learning model, and the QR includes: computing a column sum norm of a difference between a product of the first machine learning model and the second machine learning model, and the QR, to obtain the second loss function; computing a spectral norm of a difference between a product of the first machine learning model and a transpose of the first machine learning model, and a product of the QR and a transpose of the QR, to obtain the third loss function; and computing a spectral norm of a difference between a product of the second machine learning model and a transpose of the second machine learning model and a product of the transpose of the QR and the QR, to obtain the fourth loss function.

In some embodiments, the optimizing the prediction model by cross entropy to obtain a fifth loss function includes: computing the fifth loss function based on the point of interest-tag matrix and the prediction model.

In some embodiments, the obtaining a sixth loss function based on the prediction model and the QR includes: computing a spectral norm of a difference between the prediction model and the QR, to obtain the sixth loss function.

In some embodiments, the optimizing unit includes: an adding subunit configured to add, for a point of interest-tag score in the point of interest-tag score matrix, in response to the point of interest-tag score being higher than a first preset score, and a set of tags of points of interest corresponding to the point of interest-tag score excluding a tag corresponding to the point of interest-tag, the tag corresponding to the point of interest-tag into the set of tags of points of interest corresponding to the point of interest-tag score; and a deleting subunit configured to delete, in response to the point of interest-tag score being lower than a second preset score, and the set of tags of points of interest corresponding to the point of interest-tag score including the tag corresponding to the point of interest-tag, the tag corresponding to the point of interest-tag from the set of tags of points of interest corresponding to the point of interest-tag score.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any implementation in the first aspect.

In a fourth aspect, an embodiment of the present disclosure provides a computer readable medium, storing a computer program thereon, where the computer program, when executed by a processor, implements the method according to any implementation in the first aspect.

The method and apparatus for optimizing a tag of a point of interest according to embodiments of the present disclosure first acquires a set of points of interest and a set of tags of points of interest in the set of points of interest; then generates a point of interest-tag matrix based on the set of points of interest and the set of tags of points of interest in the set of points of interest; then extracts a feature of a point of interest-tag in the point of interest-tag matrix; then inputs the feature of the point of interest-tag in the point of interest-tag matrix into a pre-trained ternary self-adaptive collaborative learning model, to obtain a point of interest-tag score matrix; and finally optimizes the set of tags of points of interest in the set of points of interest based on the point of interest-tag score matrix, thereby improving the matching degree between the point of interest and the tag.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described in detail below with reference to the accompanying drawings and in combination with the embodiments.

Figure 1:
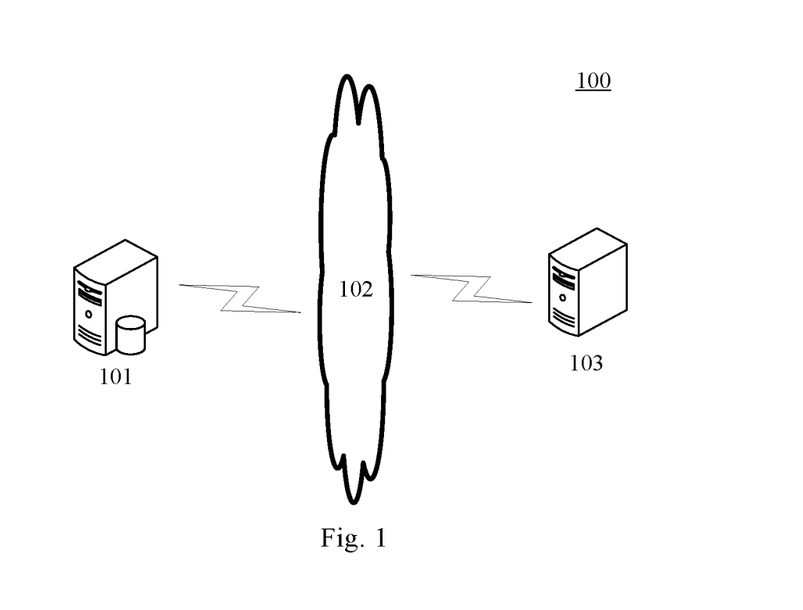
FIG. 1 is an example system architecture in which embodiments of the present disclosure may be implemented.

FIG. 1 shows an example system architecture 100 in which a method for optimizing a tag of a point of interest or an apparatus for optimizing a tag of a point of interest of an embodiment of the present disclosure may be implemented.

As shown in FIG. 1, the system architecture 100 may include a database server 101, a network 102, and a server 103. The network 102 serves as a medium providing a communication link between the database server 101 and the server 103. The network 102 may include various types of connections, such as wired or wireless communication links, or optical cables.

The database server 101 may be configured to store points of interest and tags of the points of interest of a map application.

The server 103 may be a server that provides various services, such as a tag optimizing server. The tag optimizing server may process, e.g., analyze, a set of points of interest and a set of tags of points of interest in the set of points of interest, and optimize the set of tags of points of interest in the set of points of interest based on a processing result (e.g., a point of interest-tag score matrix).

It should be noted that the server 103 may be hardware or software. When the server 103 is hardware, the server may be implemented as a distributed server cluster composed of a plurality of servers, or be implemented as a single server. When the server 103 is software, the server may be implemented as a plurality of software programs or software modules (e.g., software programs or software modules for providing distributed services), or be implemented as a single software program or software module. This is not specifically limited here.

It should be noted that the method for optimizing a tag of a point of interest provided by some embodiments of the present disclosure is generally executed by the server 103. Accordingly, the apparatus for optimizing a tag of a point of interest is generally provided in the server 103.

It should be understood that the numbers of database servers, networks, and servers in FIG. 1 are merely illustrative. Any number of database servers, networks, and servers may be provided based on actual requirements. It should be noted that in the case where the server 103 stores the set of points of interest and the set of tags of points of interest in the set of points of interest, the system architecture 100 may not be provided with the database server 101.

Figure 2:
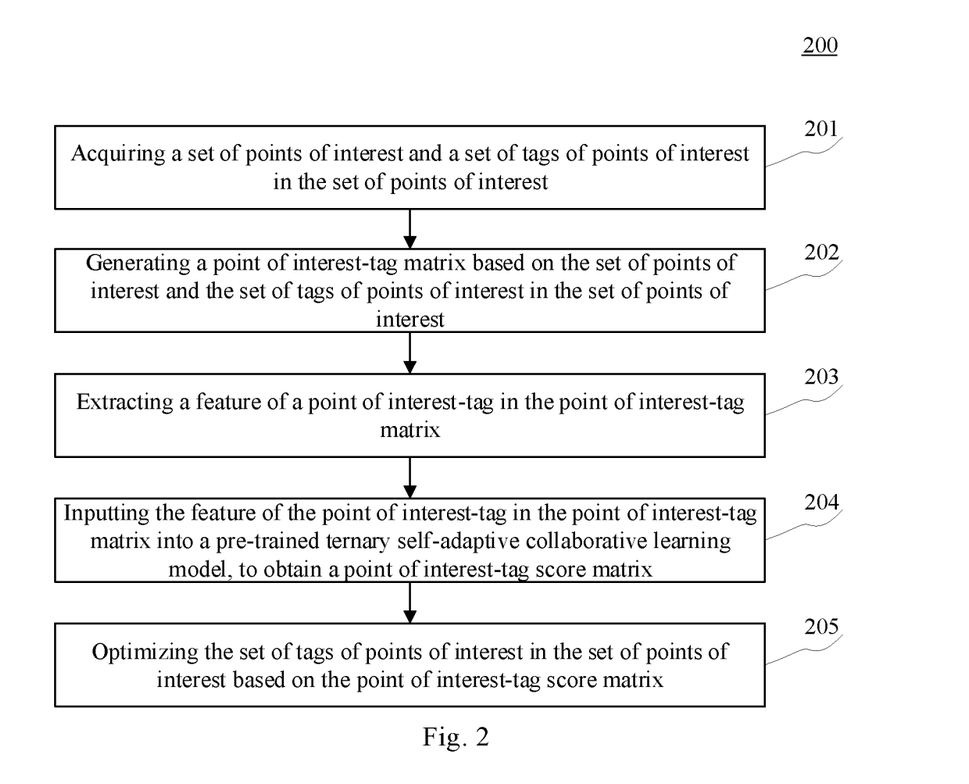
FIG. 2 is a flowchart of a method for optimizing a tag of a point of interest according to an embodiment of the present disclosure.

Further referring to FIG. 2, a process 200 of a method for optimizing a tag of a point of interest according to an embodiment of the present disclosure is shown. The method for optimizing a tag of a point of interest includes the following steps.

Step 201: acquiring a set of points of interest and a set of tags of points of interest in the set of points of interest.

In the present embodiment, an executing body (e.g., the server 103 shown in FIG. 1) of the method for optimizing a tag of a point of interest may acquire a set of points of interest and a set of tags of points of interest in the set of points of interest. In a geographical information system, a point of interest may include, but is not limited to, a shop in which a user is interested, a bus stop, a building, a subway station, and the like. A tag of a point of interest may be information of the point of interest, including but not limited to a category, attribute, and other information of the point of interest.

Generally, approaches of acquiring the set of tags of points of interest may include, but are not limited to, at least two approaches as follows.

In the first approach, the set of tags of points of interest may be obtained by manual annotation. A matching degree between a manually annotated tag and a point of interest depends on a carefulness degree of manual annotation, thereby inevitably causing some incorrect tags.

In the second approach, the set of tags of points of interest may be obtained by mining from text data. However, except for a few header points of interest, most tailer points of interest do not have a lot of comments, thereby resulting in lack of tags in the extracted set of tags.

Step 202: generating a point of interest-tag matrix based on the set of points of interest and the set of tags of points of interest in the set of points of interest.

In the present embodiment, the executing body may generate the point of interest-tag matrix based on the set of points of interest and the set of tags of points of interest in the set of points of interest. Rows of the point of interest-tag matrix correspond to points of interest, and the number of rows of the point of interest-tag matrix is equal to the number of points of interest in the set of points of interest. Columns of the point of interest-tag matrix correspond to tags, and the number of columns of the point of interest-tag matrix is equal to the number of tags in a union set of all sets of tags of points of interest in the set of points of interest. An element in the point of interest-tag matrix may be configured to show whether a corresponding set of tags of points of interest includes a corresponding tag.

For example, a set of points of interest is $P=\{p_1, p_2, \ldots, p_n\}$, and then the set P of points of interest includes n points of interest, where the i-th point of interest is $p_i$, and n is a positive integer, $1 \leq i \leq n$. A union set of all sets of tags of points of interest is $T=\{t_1, t_2, \ldots, t_m\}$, and then the union set T of all sets of tags of points of interest includes m tags, where the j-th tag is $t_j$, and m is a positive integer, $1 \leq j \leq m$. Here, a point of interest-tag matrix $\hat{Y}$ with n rows and m column is established. There is one-to-one correspondence between rows of the point of interest-tag matrix $\hat{Y}$ and points of interest in the set P of points of interest. There is one-to-one correspondence between columns of the point of interest-tag matrix $\hat{Y}$ and tags in the union set T of all sets of tags of points of interest. If a value of an (i,j)-th element in the point of interest-tag matrix Y is 1, then a set of tags of the points of interest $p_i$ includes the tag $t_j$. If a value of the (i,j)-th element in the point of interest-tag matrix $\hat{Y}$ is 0, then the set of tags of the points of interest $p_i$ excludes the tag $t_j$.

Step 203: extracting a feature of a point of interest-tag in the point of interest-tag matrix.

In the present embodiment, the executing body may extract the feature of the point of interest-tag in the point of interest-tag matrix. The feature of the point of interest-tag may include at least one of the following items: an attribute feature of a point of interest, an image feature of the point of interest, an image feature of a tag, a tag feature of the point of interest, a tag feature of the tag, or the like. Generally, the feature of the point of interest-tag may be represented in the form of a vector. For example, a feature of a point of interest in the point of interest-tag matrix $\hat{Y}$ may be $\{\vec{p}_1, \vec{p}_2, \ldots, \vec{p}_n\}$. A feature of a tag in the point of interest-tag matrix Y may be $\{\vec{t}_1, \vec{t}_2, \ldots \vec{t}_m\}$.

In some alternative implementations of the present embodiment, approaches of extracting the feature of the point of interest-tag in the point of interest-tag matrix may include, but are not limited to, at least two approaches as follows.

Specifically, for the first approach of extracting the feature of the point of interest-tag in the point of interest-tag matrix:

First, for a point of interest in the point of interest-tag matrix, historical access users and/or historical retrieval users of the point of interest are determined.

Then, user images of the historical access users and/or the historical retrieval users of the point of interest are aggregated to obtain an image feature of the point of interest.

Then, for a tag in the point of interest-tag matrix, a point of interest belonging to the tag is determined.

Finally, an image feature of the tag is generated based on the image feature of the point of interest belonging to the tag.

Generally, the executing body may compute an average value of image features of the point of interest belonging to the tag, for use as the image feature of the tag.

Specifically, for the second approach of extracting the feature of the point of interest-tag in the point of interest-tag matrix:

First, for a point of interest in the point of interest-tag matrix, an adjacent point of interest to the point of interest is determined based on map retrieval data.

If one of the historical retrieval users continuously retrieves the point of interest and the other point of interest within a very short time (e.g., within 30 min), then it may be considered that there is a side between the point of interest and the other point of interest. If a plurality of the historical retrieval users continuously retrieves the point of interest and the other point of interest within a very short time, then it may be considered that a weight of the side between the point of interest and the other point of interest is the number of historical retrieval users who continuously retrieve the point of interest and the other point of interest. In this case, if the weight of the side between the point of interest and the other point of interest exceeds a preset weight threshold, then it may be considered that the other point of interest is an adjacent point of interest to the point of interest.

Then, tag distribution of the adjacent point of interest to the point of interest is statisticized to obtain a tag feature of the point of interest.

Then, for a tag in the point of interest-tag matrix, a point of interest belonging to the tag is determined.

Finally, the tag feature of the tag is generated based on the tag feature of the point of interest belonging to the tag.

Generally, the executing body may compute an average value of tag features of the point of interest belonging to the tag, for use as the tag feature of the tag.

Step 204: inputting the feature of the point of interest-tag in the point of interest-tag matrix into a pre-trained ternary self-adaptive collaborative learning model, to obtain a point of interest-tag score matrix.

In the present embodiment, the executing body may input the feature of the point of interest-tag in the point of interest-tag matrix into the pre-trained ternary self-adaptive collaborative learning model, to obtain the point of interest-tag score matrix. The ternary self-adaptive collaborative learning model may be used for predicting a confidence level of the point of interest on the tag, which represents a probability that the set of tags of points of interest includes the tag.

In some alternative implementations of the present embodiment, the ternary self-adaptive collaborative learning model may be obtained by supervised training on an existing machine learning model using a machine learning method and training samples. Generally, the ternary self-adaptive collaborative learning model may be obtained by integrating a pre-trained first machine learning model, a second machine learning model, and a prediction model. The first machine learning model may be established based on the point of interest in the point of interest-tag matrix. The second machine learning model may be established based on the tag in the point of interest-tag matrix. The prediction model may be established based on the point of interest in the point of interest-tag matrix.

Step 205: optimizing the set of tags of points of interest in the set of points of interest based on the point of interest-tag score matrix.

In the present embodiment, the executing body may optimize the set of tags of points of interest in the set of points of interest based on the point of interest-tag score matrix.

In some alternative implementations of the present embodiment, for a point of interest-tag score in the point of interest-tag score matrix, in response to the point of interest-tag score being higher than a first preset score, and a set of tags of points of interest corresponding to the point of interest-tag score excluding a tag corresponding to the point of interest-tag, the executing body may add the tag corresponding to the point of interest-tag into the set of tags of points of interest corresponding to the point of interest-tag score, thereby achieving expanding the tag of the point of interest.

In some alternative implementations of the present embodiment, for a point of interest-tag score in the point of interest-tag score matrix, in response to the point of interest-tag score being lower than a second preset score, and the set of tags of points of interest corresponding to the point of interest-tag score including the tag corresponding to the point of interest-tag, the executing body may delete the tag corresponding to the point of interest-tag from the set of tags of points of interest corresponding to the point of interest-tag score, thereby achieving error correction of the tag of the point of interest.

The method for optimizing a tag of a point of interest provided by some embodiments of the present disclosure first acquires a set of points of interest and a set of tags of points of interest in the set of points of interest; then generates a point of interest-tag matrix based on the set of points of interest and the set of tags of points of interest in the set of points of interest; then extracts a feature of a point of interest-tag in the point of interest-tag matrix; then inputs the feature of the point of interest-tag in the point of interest-tag matrix into a pre-trained ternary self-adaptive collaborative learning model, to obtain a point of interest-tag score matrix; and finally optimizes the set of tags of points of interest in the set of points of interest based on the point of interest-tag score matrix, thereby improving the matching degree between the point of interest and the tag.

Figure 3:
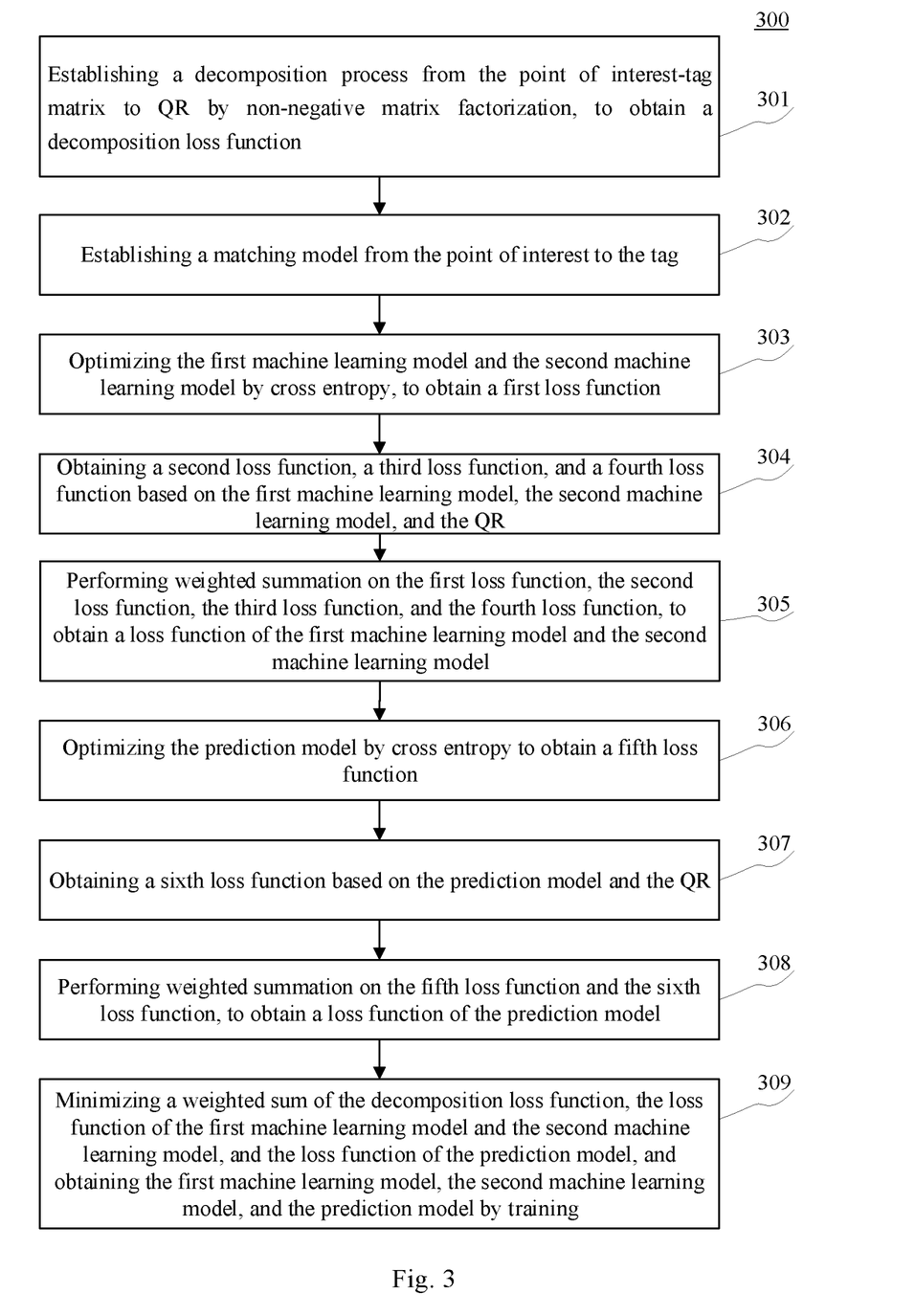
FIG. 3 is a flowchart of a method for training a first machine learning model, a second machine learning model, and a prediction model according to an embodiment of the present disclosure.

Further referring to FIG. 3, a process 300 of a method for training a first machine learning model, a second machine learning model, and a prediction model according to an embodiment of the present disclosure is shown. The method for training the first machine learning model, the second machine learning model, and the prediction model includes the following steps.

Step 301: establishing a decomposition process from the point of interest-tag matrix to QR by non-negative matrix factorization, to obtain a decomposition loss function.

In the present embodiment, an executing body (e.g., the server 103 shown in FIG. 1) of the method for training the first machine learning model, the second machine learning model, and the prediction model may establish the decomposition process from the point of interest-tag matrix to the QR by non-negative matrix factorization, to obtain the decomposition loss function. The QR may be a result of orthogonal triangular decomposition of the point of interest-tag matrix. Generally, the point of interest-tag matrix may be decomposed into a product of an orthogonal matrix and an upper triangular matrix. Q may be an orthogonal matrix decomposed from the point of interest-tag matrix by orthogonal triangular decomposition. R may be an upper triangular matrix decomposed from the point of interest-tag matrix by orthogonal triangular decomposition.

The QR may be a product of the Q and the R.

For example, the above executing body may establish the decomposition process from the point of interest-tag matrix to the QR based on the following equation.

$$L_{mf} = \|\hat{Y} - QR\|_F^2.$$

$L_{mf}$ is the decomposition loss function. $\hat{Y}$ is the point of interest-tag matrix. Q is the orthogonal matrix, and Q≥0. R is the upper triangular matrix, and R≥0. The QR is the product of the Q and the R. $\| \|_F$ is a F (Frobenius) norm of the matrix, i.e., a square root of a sum of squares of absolute values of matrix elements.

Step 302: establishing a matching model from the point of interest to the tag.

In the present embodiment, the executing body may establish the matching model from the point of interest to the tag. The matching model may be established based on a product of the first machine learning model and a transpose of the second machine learning model. The first machine learning model and the second machine learning model may be any machine learning models.

For example, the executing body may establish the matching model from the point of interest to the tag based on the following equation.

$$S=f(P)g(T)^T;$$

$$f(P)=[f(\vec{p}_1),\ldots,f(\vec{p}_n)]^T;$$

$$g(T)=[g(\vec{t}_1),\ldots,g(\vec{t}_m)]^T.$$

S is the matching model. f(P) is the first machine learning model. g(T) is the second machine learning model. $\{\vec{p}_1, \vec{p}_2, \ldots, \vec{p}_n\}$ is a feature of a point of interest in a point of interest-tag matrix $\hat{Y}$. $\{\vec{t}_1, \vec{t}_2, \ldots, \vec{t}_m\}$ is a feature of a tag in the point of interest-tag matrix $\hat{Y}$.

Step 303: optimizing the first machine learning model and the second machine learning model by cross entropy, to obtain a first loss function.

In the present embodiment, the executing body may optimize the first machine learning model and the second machine learning model by cross entropy, to obtain the first loss function.

In some alternative implementations of the present embodiment, the executing body may compute the first loss function based on the point of interest-tag matrix, the first machine learning model, and the second machine learning model.

For example, the executing body may compute the first loss function based on the following equation.

$$L_{ps1} = -\sum_{\substack{1 \leq i \leq n \\ 1 \leq j \leq m}} \left( \hat{y}_{ij} \log(f(\vec{p}_i)g(\vec{t}_j)) + (1-\hat{y}_{ij})\log(1-f(\vec{p}_i)g(\vec{t}_j)) \right).$$

$L_{ps1}$ is the first loss function, and n is a row number in the point of interest-tag matrix $\hat{Y}$. m is a column number in the point of interest-tag matrix $\hat{Y}$. $\hat{y}_{ij}$ is the (i,j)-th element in the point of interest-tag matrix $\hat{Y}$. $\vec{p}_i$ is a feature of a point of interest $p_i$ corresponding to the i-th row in the point of interest-tag matrix $\hat{Y}$. $\vec{t}_j$ is a feature of a tag $t_j$ corresponding to the j-th column in the point of interest-tag matrix $\hat{Y}$.

Step 304: obtaining a second loss function, a third loss function, and a fourth loss function based on the first machine learning model, the second machine learning model, and the QR.

In the present embodiment, the executing body may obtain the second loss function, the third loss function, and the fourth loss function based on the first machine learning model, the second machine learning model, and the QR.

In some alternative implementations of the present embodiment, the executing body may compute a column sum norm of a difference between a product of the first machine learning model and the second machine learning model, and the QR, to obtain the second loss function.

For example, the executing body may compute the second loss function based on the following equation.

$$L_{ps2}=\|f(P)g(T)-QR\|.$$

$L_{ps2}$ is the second loss function. $\| \|$ is a column sum norm of the matrix, i.e., a maximum value of a sum of absolute values of all column vectors in the matrix.

In some alternative implementations of the present embodiment, the executing body may compute a spectral norm of a difference between a product of the first machine learning model and a transpose of the first machine learning model, and a product of the QR and a transpose of the QR, to obtain the third loss function.

For example, the executing body may compute the third loss function based on the following equation.

$$L_{pp}=\|f(P)f(P)^T-QR(QR)^T\|_2.$$

$L_{pp}$ is the third loss function. $\| \|_2$ is a spectral norm of the matrix, i.e., a square root of a maximum eigenvalue of the matrix.

In some alternative implementations of the present embodiment, the executing body may compute a spectral norm of a difference between a product of the second machine learning model and the transpose of the second machine learning model, and a product of the transpose of the QR and the QR, to obtain the fourth loss function.

For example, the executing body may compute the fourth loss function based on the following equation.

$$L_{tt}=\|g(T)g(T)^T-(QR)^TQR\|_2.$$

$L_{tt}$ is the fourth loss function.

Step 305: performing weighted summation on the first loss function, the third loss function, the second loss function, and the fourth loss function, to obtain a loss function of the first machine learning model and the second machine learning model.

In the present embodiment, the executing body may perform weighted summation on the first loss function, the second loss function, the third loss function, and the fourth loss function, to obtain the loss function of the first machine learning model and the second machine learning model.

For example, the executing body may compute the loss function of the first machine learning model and the second machine learning model based on the following equation.

$$L_{ps}=\lambda_{ps1}L_{ps1}\lambda_{ps2}L_{ps2}+\lambda_{pp}L_{pp}+\lambda_{tt}L_{tt}$$

$L_{ps}$ is the loss function of the first machine learning model and the second machine learning model. $\lambda_{ps1}$ is a weight of $L_{ps1}$. $\lambda_{ps2}$ is a weight of $L_{ps2}$. $\lambda_{pp}$ is a weight of $L_{pp}$. $\lambda_{tt}$ is a weight of $L_{tt}$.

Step 306: optimizing the prediction model by cross entropy to obtain a fifth loss function.

In the present embodiment, the executing body may optimize the prediction model by cross entropy, to obtain the fifth loss function.

In some alternative implementations of the present embodiment, the executing body may compute the fifth loss function based on the point of interest-tag matrix and the prediction model.

For example, the executing body may compute the fifth loss function based on the following equation.

$$L_{c1} = -\sum_{1\leq i\leq n} (\hat{y}_{i,*}\log(c(\vec{p}_i)) + (1-\hat{y}_{i,*})\log(1-c(\vec{p}_i))).$$

$L_{c1}$ is the fifth loss function. $\hat{y}_{i,*}$ is a vector in the point of interest-tag matrix $\hat{Y}$ of the point of interest $p_i$, and represents a tag in the set of tags of the points of interest $p_i$. $c(P)=[c(\vec{p}_1), \ldots, c(\vec{p}_n)]^T$ is the prediction function.

Step 307: obtaining a sixth loss function based on the prediction model and the QR.

In the present embodiment, the executing body may obtain the sixth loss function based on the prediction model and the QR.

In some alternative implementations of the present embodiment, the executing body may compute a spectral norm of a difference between the prediction model and the QR, to obtain the sixth loss function.

For example, the executing body may compute the sixth loss function based on the following equation.

$$L_{c2}=\|c(P)-\overline{Y}\|_2.$$

$L_{c2}$ is the sixth loss function. $\overline{Y}=QR$.

Step 308: performing weighted summation on the fifth loss function and the sixth loss function, to obtain a loss function of the prediction model.

In the present embodiment, the executing body may perform weighted summation on the fifth loss function and the sixth loss function, to obtain the loss function of the prediction model.

For example, the executing body may compute the loss function of the prediction model based on the following equation.

$$L_c=\lambda_{c1}L_{c1}+\lambda_{c2}L_{c2}.$$

$L_c$ is the loss function of the prediction model. $\lambda_{c1}$ is a weight of $L_{c1}$. $\lambda_{c2}$ is a weight of $L_{c2}$.

Step 309: minimizing a weighted sum of the decomposition loss function, the loss function of the first machine learning model and the second machine learning model, and the loss function of the prediction model, and obtaining the first machine learning model, the second machine learning model, and the prediction model by training.

In the present embodiment, the executing body may minimize the weighted sum of the decomposition loss function, the loss function of the first machine learning model and the second machine learning model, and the loss function of the prediction model, and obtain the first machine learning model, the second machine learning model, and the prediction model by training.

For example, the executing body may minimize the weighted sum of the decomposition loss function, the loss function of the first machine learning model and the second machine learning model, and the loss function of the prediction model based on the following equation.

$$\min L=\lambda_{mf}L_{mf}+\lambda_{ps}L_{ps}+\lambda_c L_c\lambda_\Theta\|\Theta\|_2.$$

L is the weighted sum of the decomposition loss function, the loss function of the first machine learning model and the second machine learning model, and the loss function of the prediction model. $\lambda_{mf}$ is a weight of $L_{mf}$, $\lambda_{ps}$ is a weight of $L_{ps}$. $\lambda_c$ is a weight of $L_c$. $\lambda_\Theta$ is weights of all parameters. $\Theta$ is all parameters, i.e., all parameters of the first machine learning model, the second machine learning model, and the prediction model.

Then, the executing body may integrate a pre-trained first machine learning model, the second machine learning model, and the prediction model to obtain a ternary self-adaptive collaborative learning model. For example, the ternary self-adaptive collaborative learning model may learn a point of interest-tag score of a point of interest $p_0$ based on the following equation.

$$y_{0,*}=(1-\alpha-\beta)y_{0,*}^{mf}+\alpha y_{0,*}^{ps}\beta y_{0,*}^c.$$

$y_{0,*}$ is the point of interest-tag score of the point of interest $p_0$, $y_{0,*}^{mf}$ is a decomposition loss function corresponding to the point of interest $p_0$, $y_{0,*}^{ps}$ is the loss function of the first machine learning model and the second machine learning model corresponding to the point of interest $p_0$, $y_{0,*}^c$ is the loss function of the prediction model corresponding to the point of interest $p_0$, $\alpha$ is a weight of $y_{0,*}^{ps}$, and $\beta$ is a weight of $y_{0,*}^c$.

Figure 4:
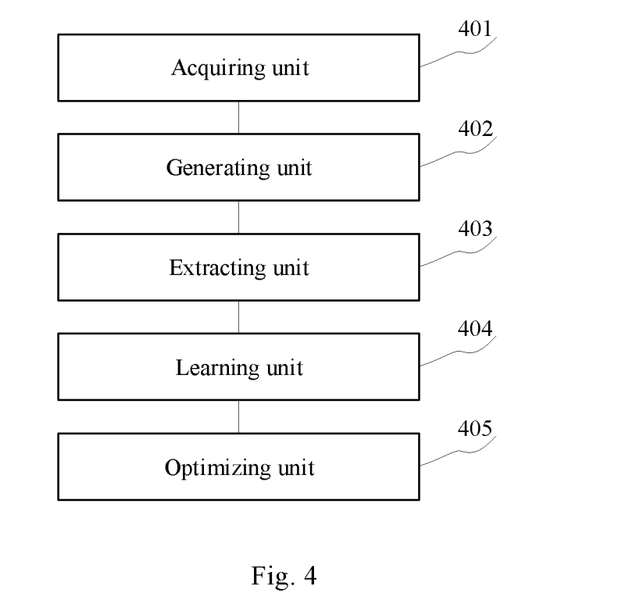
FIG. 4 is a schematic structural diagram of an apparatus for optimizing a tag of a point of interest according to an embodiment of the present disclosure.

Further referring to FIG. 4, as an implementation of the method shown in the above figures, an embodiment of the present disclosure provides an apparatus for optimizing a tag of a point of interest. The embodiment of the apparatus corresponds to the embodiment of the method shown in FIG. 2, and the apparatus may be specifically applied to various electronic devices.

As shown in FIG. 4, the apparatus 400 for optimizing a tag of a point of interest of the present embodiment may include: an acquiring unit 401, a generating unit 402, an extracting unit 403, a learning unit 404, and an optimizing unit 405. The acquiring unit 401 is configured to acquire a set of points of interest and a set of tags of points of interest in the set of points of interest; the generating unit 402 is configured to generate a point of interest-tag matrix based on the set of points of interest and the set of tags of points of interest in the set of points of interest; the extracting unit 403 is configured to extract a feature of a point of interest-tag in the point of interest-tag matrix; the learning unit 404 is configured to input the feature of the point of interest-tag in the point of interest-tag matrix into a pre-trained ternary self-adaptive collaborative learning model, to obtain a point of interest-tag score matrix; and the optimizing unit 405 is configured to optimize the set of tags of points of interest in the set of points of interest based on the point of interest-tag score matrix.

The specific processing of the acquiring unit 401, the generating unit 402, the extracting unit 403, the learning unit 404, and the optimizing unit 405 of the apparatus 400 for optimizing a tag of a point of interest and the technical effects thereof in the present embodiment may refer to the related description of step 201, step 202, step 203, step 204, and step 205 in the corresponding embodiment of FIG. 2, respectively. The description will not be repeated here.

In some alternative implementations of the present embodiment, the feature of the point of interest-tag may include at least one of the following items: an attribute feature of a point of interest, an image feature of the point of interest, an image feature of a tag, a tag feature of the point of interest, or a tag feature of the tag.

In some alternative implementations of the present embodiment, the extracting unit 403 includes: a first determining subunit (not shown in the figure) configured to determine, for a point of interest in the point of interest-tag matrix, historical access users and/or historical retrieval users of the point of interest; an aggregating subunit (not shown in the figure) configured to aggregate user images of the historical access users and/or the historical retrieval users of the point of interest to obtain an image feature of the point of interest; a second determining subunit (not shown in the figure) configured to determine, for a tag in the point of interest-tag matrix, a point of interest belonging to the tag;

a first generating subunit (not shown in the figure) configured to generate an image feature of the tag based on the image feature of the point of interest belonging to the tag; and/or a third determining subunit (not shown in the figure) configured to determine, for a point of interest in the point of interest-tag matrix, an adjacent point of interest to the point of interest based on map retrieval data; a statisticizing subunit (not shown in the figure) configured to statisticize tag distribution of the adjacent point of interest to the point of interest to obtain a tag feature of the point of interest; a fourth determining subunit (not shown in the figure) configured to determine, for a tag in the point of interest-tag matrix, a point of interest belonging to the tag; and a second generating subunit (not shown in the figure) configured to generate the tag feature of the tag based on the tag feature of the point of interest belonging to the tag.

In some alternative implementations of the present embodiment, the first generating subunit is further configured to: compute an average value of the image feature of the point of interest belonging to the tag, for use as the image feature of the tag, and the second generating subunit is further configured to compute an average value of the tag feature of the point of interest belonging to the tag, for use as the tag feature of the tag.

In some alternative implementations of the present embodiment, the apparatus 400 for optimizing a tag of a point of interest further includes: an integrating unit (not shown in the figure) configured to integrate a pre-trained first machine learning model, a second machine learning model, and a prediction model to obtain the ternary self-adaptive collaborative learning model, where the first machine learning model is established based on points of interest in the point of interest-tag matrix, the second machine learning model is established based on tags in the point of interest-tag matrix, and the prediction model is established based on the points of interest in the point of interest-tag matrix.

In some alternative implementations of the present embodiment, the first machine learning model, the second machine learning model, and the prediction model are obtained by the following training: establishing a decomposition process from the point of interest-tag matrix to QR by non-negative matrix factorization, to obtain a decomposition loss function, where the QR is a result of orthogonal triangular decomposition of the point of interest-tag matrix, Q is an orthogonal matrix, and R is an upper triangular matrix; establishing a matching model from the point of interest to the tag, where the matching model is established based on a product of the first machine learning model and a transpose of the second machine learning model; optimizing the first machine learning model and the second machine learning model by cross entropy, to obtain a first loss function; obtaining a second loss function, a third loss function, and a fourth loss function based on the first machine learning model, the second machine learning model, and the QR; performing weighted summation on the first loss function, the second loss function, the third loss function, and the fourth loss function, to obtain a loss function of the first machine learning model and the second machine learning model; optimizing the prediction model by cross entropy to obtain a fifth loss function; obtaining a sixth loss function based on the prediction model and the QR; performing weighted summation on the fifth loss function and the sixth loss function, to obtain a loss function of the prediction model; and minimizing a weighted sum of the decomposition loss function, the loss function of the first machine learning model and the second machine learning model, and the loss function of the prediction model, and obtaining the first machine learning model, the second machine learning model, and the prediction model by training.

In some alternative implementations of the present embodiment, the optimizing the first machine learning model and the second machine learning model by cross entropy, to obtain a first loss function includes: computing the first loss function based on the point of interest-tag matrix, the first machine learning model, and the second machine learning model.

In some alternative implementations of the present embodiment, the obtaining a second loss function, a third loss function, and a fourth loss function based on the first machine learning model, the second machine learning model, and the QR includes: computing a column sum norm of a difference between a product of the first machine learning model and the second machine learning model, and the QR, to obtain the second loss function; computing a spectral norm of a difference between a product of the first machine learning model and a transpose of the first machine learning model, and a product of the QR and a transpose of the QR, to obtain the third loss function; and computing a spectral norm of a difference between a product of the second machine learning model and a transpose of the second machine learning model and a product of the transpose of the QR and the QR, to obtain the fourth loss function.

In some alternative implementations of the present embodiment, the optimizing the prediction model by cross entropy to obtain a fifth loss function includes: computing the fifth loss function based on the point of interest-tag matrix and the prediction model.

In some alternative implementations of the present embodiment, the obtaining a sixth loss function based on the prediction model and the QR includes: computing a spectral norm of a difference between the prediction model and the QR, to obtain the sixth loss function.

In some alternative implementations of the present embodiment, the optimizing unit 405 includes: an adding subunit (not shown in the figure) configured to add, for a point of interest-tag score in the point of interest-tag score matrix, in response to the point of interest-tag score being higher than a first preset score, and a set of tags of points of interest corresponding to the point of interest-tag score excluding a tag corresponding to the point of interest-tag, the tag corresponding to the point of interest-tag into the set of tags of points of interest corresponding to the point of interest-tag score; and a deleting subunit (not shown in the figure) configured to delete, in response to the point of interest-tag score being lower than a second preset score, and the set of tags of points of interest corresponding to the point of interest-tag score including the tag corresponding to the point of interest-tag, the tag corresponding to the point of interest-tag from the set of tags of points of interest corresponding to the point of interest-tag score.

Figure 5:
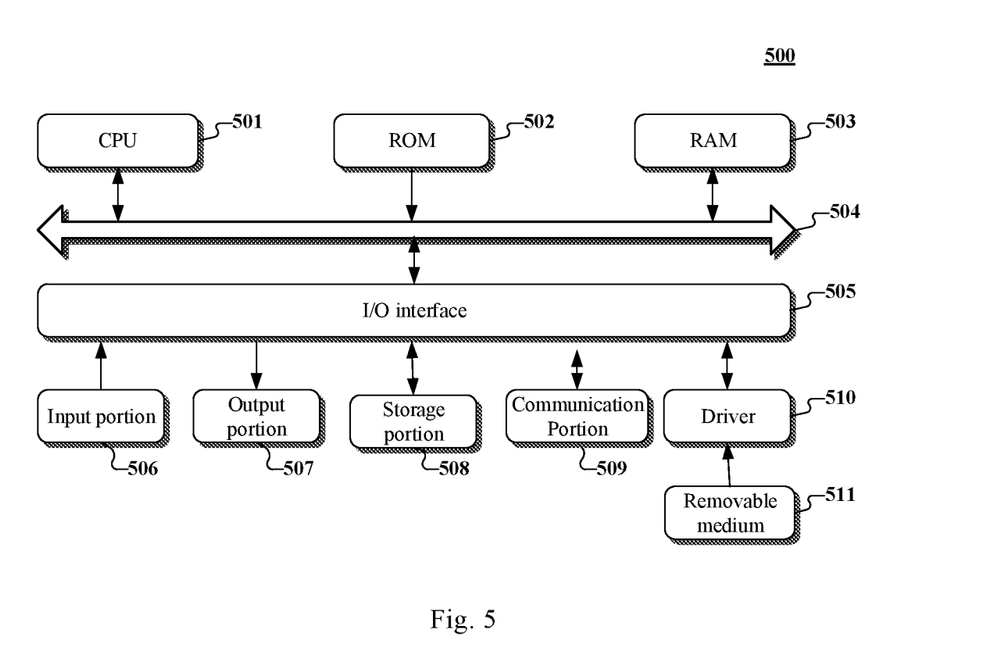
FIG. 5 is a schematic structural diagram of a computer system adapted to implement an electronic device of the embodiments of the present disclosure.

Referring to FIG. 5, a schematic structural diagram of a computer system 500 of an electronic device adapted to implement the embodiments of the present disclosure is shown. The electronic device shown in FIG. 5 is merely an example, and should not limit the function and scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a touch screen, touch pad, keyboard, mouse, camera, microphone, accelerometer, gyroscope and the like; an output portion 507 including a liquid crystal display (LCD), a speaker, a vibrator and the like; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, so that a computer program read therefrom is installed on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by software or hardware. The described units may alternatively be provided in a processor, for example, described as: a processor including an acquiring unit, a generating unit, an extracting unit, a learning unit, and an optimizing unit. The names of the units do not constitute a limitation to such units themselves in some cases. For example, the acquiring unit may be further described as "a unit configured to acquire a set of points of interest and a set of tags of points of interest in the set of points of interest."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire a set of points of interest and a set of tags of points of interest in the set of points of interest; generate a point of interest-tag matrix based on the set of points of interest and the set of tags of points of interest in the set of points of interest; extract a feature of a point of interest-tag in the point of interest-tag matrix; input the feature of the point of interest-tag in the point of interest-tag matrix into a pre-trained ternary self-adaptive collaborative learning model, to obtain a point of interest-tag score matrix; and optimize the set of tags of points of interest in the set of points of interest based on the point of interest-tag score matrix.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for optimizing a tag of a point of interest, comprising:
   acquiring a set of points of interest and a set of tags of points of interest in the set of points of interest;
   generating a point of interest-tag matrix based on the set of points of interest and the set of tags of points of interest in the set of points of interest;
   extracting a feature of a point of interest-tag in the point of interest-tag matrix;
   inputting the feature of the point of interest-tag in the point of interest-tag matrix into a pre-trained ternary self-adaptive collaborative learning model, to obtain a point of interest-tag score matrix; and
   optimizing the set of tags of points of interest in the set of points of interest based on the point of interest-tag score matrix.

2. The method according to claim 1, wherein the feature of the point of interest-tag comprises at least one of following items: an attribute feature of a point of interest, an image feature of the point of interest, an image feature of a tag, a tag feature of the point of interest, or a tag feature of the tag.

3. The method according to claim 2, wherein the extracting a feature of a point of interest-tag in the point of interest-tag matrix comprises:
   determining, for a point of interest in the point of interest-tag matrix, historical access users or historical retrieval users of the point of interest; aggregating user images of the historical access users or the historical retrieval users of the point of interest to obtain an image feature of the point of interest; determining, for a tag in the point of interest-tag matrix, a point of interest belonging to the tag; and generating an image feature of the tag based on the image feature of the points of interest belonging to the tag; or
   determining, for a point of interest in the point of interest-tag matrix, an adjacent point of interest to the point of interest based on map retrieval data; statisticizing tag distribution of the adjacent point of interest to the point of interest to obtain a tag feature of the point of interest; determining, for a tag in the point of interest-tag matrix, a point of interest belonging to the tag; and generating the tag feature of the tag based on the tag feature of the point of interest belonging to the tag.

4. The method according to claim 3, wherein the generating an image feature of the tag based on the image feature of the point of interest belonging to the tag comprises:
   computing an average value of the image feature of the point of interest belonging to the tag, for use as the image feature of the tag, and
   the generating the tag feature of the tag based on the tag feature of the point of interest belonging to the tag comprises:
   computing an average value of the tag feature of the point of interest belonging to the tag, for use as the tag feature of the tag.

5. The method according to claim 1, wherein before the inputting the feature of the point of interest-tag in the point of interest-tag matrix into a pre-trained ternary self-adaptive collaborative learning model, to obtain a point of interest-tag score matrix, the method further comprises:
   integrating a pre-trained first machine learning model, a second machine learning model, and a prediction model to obtain the ternary self-adaptive collaborative learning model, wherein the first machine learning model is established based on points of interest in the point of interest-tag matrix, the second machine learning model is established based on tags in the point of interest-tag matrix, and the prediction model is established based on the points of interest in the point of interest-tag matrix.

6. The method according to claim 5, wherein the first machine learning model, the second machine learning model, and the prediction model are obtained by following training:
   establishing a decomposition process from the point of interest-tag matrix to QR by non-negative matrix factorization, to obtain a decomposition loss function, wherein the QR is a result of orthogonal triangular decomposition of the point of interest-tag matrix, Q is an orthogonal matrix, and R is an upper triangular matrix;
   establishing a matching model from the point of interest to the tag, wherein the matching model is established based on a product of the first machine learning model and a transpose of the second machine learning model;
   optimizing the first machine learning model and the second machine learning model by cross entropy, to obtain a first loss function;
   obtaining a second loss function, a third loss function, and a fourth loss function based on the first machine learning model, the second machine learning model, and the QR;
   performing weighted summation on the first loss function, the second loss function, the third loss function, and the fourth loss function, to obtain a loss function of the first machine learning model and the second machine learning model;
   optimizing the prediction model by cross entropy to obtain a fifth loss function;
   obtaining a sixth loss function based on the prediction model and the QR;
   performing weighted summation on the fifth loss function and the sixth loss function, to obtain a loss function of the prediction model; and
   minimizing a weighted sum of the decomposition loss function, the loss function of the first machine learning model and the second machine learning model, and the loss function of the prediction model, and obtaining the first machine learning model, the second machine learning model, and the prediction model by training.

7. The method according to claim 6, wherein the optimizing the first machine learning model and the second machine learning model by cross entropy, to obtain a first loss function comprises:
computing the first loss function based on the point of interest-tag matrix, the first machine learning model, and the second machine learning model.

8. The method according to claim 6, wherein the obtaining a second loss function, a third loss function, and a fourth loss function based on the first machine learning model, the second machine learning model, and the QR comprises:
computing a column sum norm of a difference between a product of the first machine learning model and the second machine learning model, and the QR, to obtain the second loss function;
computing a spectral norm of a difference between a product of the first machine learning model and a transpose of the first machine learning model, and a product of the QR and a transpose of the QR, to obtain the third loss function; and
computing a spectral norm of a difference between a product of the second machine learning model and a transpose of the second machine learning model, and a product of the transpose of the QR and the QR, to obtain the fourth loss function.

9. The method according to claim 6, wherein the optimizing the prediction model by cross entropy to obtain a fifth loss function comprises:
computing the fifth loss function based on the point of interest-tag matrix and the prediction model.

10. The method according to claim 6, wherein the obtaining a sixth loss function based on the prediction model and the QR comprises:
computing a spectral norm of a difference between the prediction model and the QR, to obtain the sixth loss function.

11. The method according to claim 1, wherein the optimizing the set of tags of points of interest in the set of points of interest based on the point of interest-tag score matrix comprises:
adding, for a point of interest-tag score in the point of interest-tag score matrix, in response to the point of interest-tag score being higher than a first preset score, and a set of tags of points of interest corresponding to the point of interest-tag score excluding a tag corresponding to the point of interest-tag, the tag corresponding to the point of interest-tag into the set of tags of points of interest corresponding to the point of interest-tag score; and
deleting, in response to the point of interest-tag score being lower than a second preset score, and the set of tags of points of interest corresponding to the point of interest-tag score including the tag corresponding to the point of interest-tag, the tag corresponding to the point of interest-tag from the set of tags of points of interest corresponding to the point of interest-tag score.

12. An apparatus for optimizing a tag of a point of interest, comprising:
at least one processor; and
a memory storing instructions, wherein the instructions when executed by the at least one processor, cause the at least one processor to perform operations, the operations comprising:
acquiring a set of points of interest and a set of tags of points of interest in the set of points of interest;
generating a point of interest-tag matrix based on the set of points of interest and the set of tags of points of interest in the set of points of interest;
extracting a feature of a point of interest-tag in the point of interest-tag matrix;
inputting the feature of the point of interest-tag in the point of interest-tag matrix into a pre-trained ternary self-adaptive collaborative learning model, to obtain a point of interest-tag score matrix; and
optimizing the set of tags of points of interest in the set of points of interest based on the point of interest-tag score matrix.

13. A non-transitory computer readable medium, storing a computer program thereon, wherein the computer program, when executed by a processor, implements the method according to claim 1.

* * * * *